US 8,831,586 B2

(12) United States Patent
Gao et al.

(10) Patent No.: US 8,831,586 B2
(45) Date of Patent: Sep. 9, 2014

(54) METHOD AND SYSTEM FOR REPORTING NEIGHBOR CELL INFORMATION

(75) Inventors: Yin Gao, Shenzhen (CN); Lifeng Han, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 13/583,059

(22) PCT Filed: Mar. 15, 2011

(86) PCT No.: PCT/CN2011/071809
§ 371 (c)(1),
(2), (4) Date: Sep. 6, 2012

(87) PCT Pub. No.: WO2011/120379
PCT Pub. Date: Oct. 6, 2011

(65) Prior Publication Data
US 2013/0012188 A1 Jan. 10, 2013

(30) Foreign Application Priority Data
Mar. 29, 2010 (CN) .......................... 2010 1 0140595

(51) Int. Cl.
*H04W 4/00* (2009.01)
*H04W 24/10* (2009.01)
*H04W 36/00* (2009.01)
*H04W 48/16* (2009.01)
*H04W 36/08* (2009.01)

(52) U.S. Cl.
CPC .......... *H04W 24/10* (2013.01); *H04W 36/0083* (2013.01); *H04W 48/16* (2013.01); *H04W 36/08* (2013.01)
USPC ........... 455/422; 455/424; 455/67.1; 455/423

(58) Field of Classification Search
USPC .............................. 455/424, 422.1, 67.1, 423
See application file for complete search history.

(56) References Cited

U.S. PATENT DOCUMENTS 6,970,702 B1 * 11/2005 Martin ........................... 455/424
7,353,019 B2 * 4/2008 Martin ........................... 455/424
(Continued)

FOREIGN PATENT DOCUMENTS

CN 1434595 A * 8/2003
CN 101888652 A 11/2010
(Continued)

OTHER PUBLICATIONS

International Search Report for PCT/CN2011/071809 dated Jun. 30, 2011.
(Continued)

*Primary Examiner* — David Q Nguyen
(74) *Attorney, Agent, or Firm* — Banner & Witcoff, Ltd.

(57) ABSTRACT

The present invention provides a method and system for reporting neighbor cell information. The method includes: a network side sending a measurement configuration and reporting information of a drive test to user equipment; the user equipment performing the drive test, and reporting drive test results containing information of neighbor cells around the user equipment to the network side when a reporting triggering condition is satisfied (201). In the present invention, by using a Minimize drive test (MDT) measurement event in the drive test, the information of neighbor cells around the user equipment is discovered and reported to the network side for maintenance, and since the network side obtains the information of neighbor cells around the user equipment in time, the effectiveness of the user equipment performing the cell handover is guaranteed, thereby enhancing a network performance of a communication system.

10 Claims, 3 Drawing Sheets

(56) References Cited

U.S. PATENT DOCUMENTS

| | | | |
|---|---|---|---|
| 2003/0087635 A1* | 5/2003 | Sheffield | 455/423 |
| 2006/0079222 A1* | 4/2006 | Martin | 455/423 |
| 2009/0005029 A1 | 1/2009 | Wang et al. | |
| 2010/0322169 A1* | 12/2010 | Narasimha | 370/329 |

FOREIGN PATENT DOCUMENTS

| | | |
|---|---|---|
| JP | 2008-219645 A | 9/2008 |
| JP | 2010-011261 A | 1/2010 |

OTHER PUBLICATIONS

Ericsson, Logged MDT measurement reporting, 3GPPTSG-RAN WG2 Meeting #69, Tdoc R2-101425, Feb. 26, 2010, Sections 1-4, Figure 1.

3GPP TSG-RAN2#77bis, Mar. 26-30, 2012, Jeju, South Korea, R2-121542, NTTDOCOMO, Inc., Reporting Triggers for Immediate MDT.

3GPP TR 36.805, V9.0.0 (Dec. 2009, 3rd Generation Partnership Project; Technical Specification Group Radio Access Network; Study on Minimization of drive-tests in Next Generation Networks (Release 9), Dec. 2009.

3GPP TSG-RAN2#68bis, Jan. 18-22, 2010, Valencia, Spain, R2-100472, NTT Docomo, Inc., MDT Requirements and Expected Stage 2/3 work, Discussion, Agenda 4.3.1, Jan. 2010.

3GPP TS 36.331 V9.1.0 (Dec. 2009), 3rd Generation Partnership Project; Technical Specification Group Radio Access Network; Evolved Universal Terrestrial Radio Access (E-UTRA) Radio Resource Control (RRC); Protocol specification (Release 9), Dec. 2009.

3GPP Tsg-Ran WG2 Meeting #69, R2-100247, San Francisco, U.S. 22 - 26, Feb. 2010, Agenda 4.3.1, Nokia Corporation, Nokia Siemens Networks, entitled Mdt Architecture for Connected Mode Reporting.

3GPP Tsg-Ran WG2 Meeting #68bis, R2-100239, Valencia, Spain, 18th - 22nd Jan. 2010, Agenda 4.3.1, Orange, Telecom Italia, Deutsche Telekon, entitled Mdt Measurement Model.

* cited by examiner

METHOD AND SYSTEM FOR REPORTING NEIGHBOR CELL INFORMATION

TECHNICAL FIELD

The present invention relates to Minimize drive test (MDT) technology, and particularly, to utilizing the MDT technology to implement a method and system for reporting neighbor cell information, which is applied to a Universal Mobile Telecommunications System (UMTS) and Long Term Evolution (LTE) system/LTE-Advanced (LTE-A) system.

BACKGROUND OF THE RELATED ART

In a communication system, in order to decrease network construction and operation costs, a traditional drive test is: using manual labor to test an area required to be monitored and optimized.

Based on the evolution of the next generation network, on one hand, in order to reduce the dependence on the traditional drive test, on the other hand, in order to enable a test result of a User Equipment (UE) to be used for optimizing the network automatically and understanding an operating condition of the network comprehensively, a technical research of MDT is proposed in the LTE system. The MDT technology also can be applied in the UMTS. The implementation mode of the MDT technology is based on an eNB sending measurement control and report mechanism to the UE and the UE reporting after the measurement. FIG. 1 is a schematic diagram of an application framework of the existing MDT in the UMTS, and as shown in FIG. 1, a network side and a terminal device are included, wherein, the network side includes a Radio Access Network (RAN) side device and a network management system. The report mechanism includes three types, i.e. real-time reporting in connection state, log reporting in IDLE state and log reporting in connection state.

Currently, the measurement contents of the MDT mainly include the following kinds.

1) Periodical downlink pilot measurement: namely, radio environment measurement, such as a periodical record on Common Pilot Channel Received Signal Code Power (CPICH RSCP), CPICH Energy per chip to noise power density (CPICH Ec/No), Reference Signal Received Power (RSRP) and Reference Signal Received Quality (RSRQ) (only in connection mode). This measurement log corresponds to the user example "Coverage Optimization".

Operators realize that main measurements of the downlink (DL) coverage or achievable throughput are common pilot receiving grade and Signal to Interference Ratio (SIR) grade. A configuration for the existing Radio Resource Management (RRM) measurement is mainly dependent on a measurement report and periodical report of event trigger. Some restrictions also exist as below.

a) There is no accompanying location information. Even though the operators can use the DL coverage to distinguish a cell, the operators still need to determine an area having the problem in the cell by executing a drive test, for the accurate location information can be detected by the low common pilot receiving grade/SIR grade, and can not be obtained from the current RRM mechanism.

b) The existing RRM mechanism only allows to make the measurement report when the UE has been connected to a specific cell and there is sufficient uplink (UL) coverage for transmitting the measurement report. This will limit the measurements collected from the UE, and the UE can not experience a Reliable Linked Frame (RLF) and sufficient UL coverage.

2) Serving Cell signal becomes worse than threshold: that is, when measurement of the serving cell is less than the configured threshold, the radio environment measurement is recorded, such as CPICH RSCP, CPICH Ec/No, or Time Division Duplex Primary CPICH RSCP (TDD P-CCPCH RSCP) and Interference Signal Code Power (ISCP), RSRP and RSRQ (only in connection mode). A measurement log window is required, and the object is to collect information in a certain period of time before and after the event occurs. The measurement log corresponds to the user example "Coverage Optimization".

If the operators are interested in a specific DL coverage problem, the measurement log corresponding to the interested problem is effective. In order to find out the area in problem, the operators can transform their standards (e.g. outside the coverage) into a threshold. In order to distinguish a characteristic of the problem (e.g. occurred in a specific mobile scenario), the measurement content is the useful measurement log provision information.

3) Transmit power headroom becomes less than threshold: that is, when the transmit power headroom of the UE is less than the configured threshold, the transmit power headroom and radio environment measurement such as CPICH RSCP, CPICH Ec/No, or TDD P-CCPCH RSCP and ISCP, RSRP and RSRQ (only in connection mode) are recorded. The measurement log corresponds to the user example "Coverage Optimization".

The operators can detect that there is no sufficient UL link budget by observing a UL transmit power grade, and also can infer the achievable UL throughput grade in the network. Collecting such information can help the operators adjust Cell Individual Offset (CIO) better to determine a layout of the cell in the network center and adjust the antenna tilt angle and so on.

4) Random access failure: that is, when the random access failure occurs, the detail information about the random access and the radio environment measurement such as CPICH RSCP, CPICH Ec/No, or TDD P-CCPCH RSCP and ISCP, RSRP and RSRQ (only in connection state) are recorded. The measurement log corresponds to the user example "Coverage Optimization".

The reason of the random access failure is, for example, an inaccurate transmitting power setup or competition and so on. The operators can collect the information about the random access failure to analyze the characteristics of the random access failure. A DL radio environment measurement is also necessary, such as the measurement of CPICH RSCP, CPICH Ec/No, RSRP and RSRQ, for the open loop power control in random access process relies on these characteristics. Collecting such information can help the operators adjust random access parameters and the antenna tilt angle and so on.

5) Paging Channel failure: that is, when the UE does not decode a PCCH in a paging channel within the continuous time of X2, the detail information such as location information, time and cell identification of radio environment is recorded (even though the operators can decode a PDCCH during the paging). The measurement log corresponds to the user example "Common Channel Parameterization".

In the IDLE mode, for the operators, whether the UE can be paged reliably is extremely important. If one user can not be paged reliably, it will have a negative influence on the user experience (at least in a paging unit), and also have an influence on incomes of the operators (for call opportunities becomes less). In the current network, the drive test can be used to estimate the ability of the UE by receiving paging message within the cell coverage area. Since these actions will cause high costs, if the UE can record the occurrence time in which the UE can not decode the information on the paging channel and other related information, it will be very beneficial.

6) Broadcast Channel failure: that is, when the UE does not read a related DL common channel to obtain the required system message for residing in one cell, message information such as location information, time, cell identification and frequency of radio environment is recorded. The measurement corresponds to the user examples "Coverage and Capacity Optimization" and "Common Channel Parameterization".

7) Radio Link failure report: that is, when the UE has the RLF, the UE reports a radio measurement, such as CPICH RSCP, CPICH Ec/No, or TDD P-CCPCH RSCP and ISCP, RSRP and RSRQ. The measurement of RLF Report corresponds to the user example "Coverage Optimization".

The RLF Report can distinguish several problems from the coverage aspects. Therefore, in a realistic network, it is expected that the probability of detecting the coverage holes through the RLF Report measurement information can be high. In addition, some problems generally related to the detection for the DL common channel are also resulted from the coverage problem. The RLF Report provides a method for solving a basic DL coverage problem, and specific measurements of the common channel parameterization can concentrate on adjusting common channel parameters.

Collecting the measurement information of measurement contents of the above MDT can help the operators find out the coverage problems in the specific area and minimize the manual drive test.

Meanwhile, service continuity for mobile users is a basic function of a cellular mobile communication system, and the handover of the serving cells of the mobile station is a main measure for guaranteeing the service continuity. In order to facilitate the handover of the user equipment, the system needs to configure an adjacency relation for each cell, such that the network side informs the user equipment of neighbor cell information, the user equipment reports a measurement result after measuring the neighbor cell, and the network side indicates the user equipment to switch to a certain neighbor cell according to the reported measurement result.

Which neighbor cells around that a certain cell has is not only related to the cell distance, but also closely related to the radio environment in which the cell is located. For the radio environment, especially an urban area environment which has concentrated high-rise buildings, is intricate and complicated, it is difficult to precisely judge which cell should be configured to which neighbor cells in the preliminary stage of the network plan. Moreover, some situations such as newly adding one cell or cell attribute change in the system but not updating a neighboring relation of the cell in time, or environmental change and omission of network plan staff, all will cause that the neighbor cell information is not updated in time. Therefore, the user equipment can not be switched to other cells in time, such that the load of the current cell is excessively heavy, the signal quality of the current cell becomes worse, and the situation of serious interference or user call drop occurs.

However, the MDT technology mentioned previously can fully use the measurement of the UE to collect and report the situations of surrounding radio environments. Currently, no effective measuring method has been provided to enable the UE to obtain the surrounding neighbor cell information and report.

SUMMARY OF THE INVENTION

In view of this, the main object of the present invention is to provide a method and system for implementing neighbor cell reporting, which can implement an automatic discovery and maintenance of neighbor cell relations and guarantee a timeliness of cell handover, thereby providing the communication system performance.

In order to achieve the foregoing objects, the technical scheme of the present invention is implemented as follows.

A method for implementing neighbor cell reporting comprises:

a network side sending a measurement configuration and reporting information of a drive test to a user equipment;

the user equipment performing the drive test, and reporting drive test results containing information of neighbor cells around the user equipment to the network side when a reporting triggering condition is satisfied.

The method further comprises: the network side managing the neighbor cells according to the information of neighbor cells around the user equipment in the drive test results.

Managing the neighbor cells is:

the network side processing the collected drive test results in local; or, the network side sending the collected drive test results to a network management system to process.

The measurement configuration of the drive test contains a newly added measurement event;

the newly added measurement event is described as that signals of surrounding cells are higher than a preset threshold, and is used to record radio environment measurement when the signals of the surrounding cells measured by the user equipment are higher than the configured threshold.

The measurement event uses a real-time reporting mode, and at the point, contents measured and reported by the newly added measurement event comprise:

a measurement triggering type: triggering the measurement when the signals of the surrounding cells measured by the user equipment are higher than the threshold;

a configuration parameter: the threshold;

measurement contents: containing any combination of one or several kinds of following contents:

location information: location information when measurement event triggering occurs and location information when measurement recording occurs;

a timestamp: a time at which measurement event triggering occurs and a time at which measurement recording occurs;

cell identity information: cell identification information of the surrounding cells measured when measurement event triggering occurs; and radio environment measurement information: signal quality information of the surrounding cells measured when measurement event triggering occurs.

The measurement event uses a log reporting mode, and at the point, the contents measured and reported by the newly added measurement event further comprise:

a measurement log window, used to indicate a log recording window;

a measurement log interval, used to indicate a measurement recording interval under the log recording window;

the radio environment measurement information further comprises: the signal quality information of the surrounding cells in the measurement log window before and after the measurement event triggering occurs.

In a Long Term Evolution (LTE) system, the cell identity information is Physical Cell Identifier (PCI) information and/or Cell Global Identifier (CGI) information;

in a Universal Mobile Telecommunications System (UMTS), the cell identity information is Primary Scrambling Code (PSC) information, and/or Cell Identifier (CI) information, and/or Tracking Area Code (TAC) information, and/or Routing Area Code (RAC) information, and/or Public Land Mobile Network (PLMN) information of the cells.

A system for implementing neighbor cell reporting at least comprises: a user equipment and a network side, wherein, the network side is configured to: send a measurement configuration and reporting information of a drive test to the user equipment;

the user equipment is configured to: perform the drive test, and report drive test results containing information of neighbor cells around the user equipment to the network side when a reporting condition is satisfied.

The network side is further configured to: manage the neighbor cells according to the information of neighbor cells around the user equipment in the drive test results.

The network side comprises a Radio Access Network (RAN) side device;

in a Universal Mobile Telecommunications System (UMTS), the RAN side device is a Radio Network Controller (RNC); and in a Long Term Evolution (LTE) system, the RAN side device is an eNB.

The network side further comprises a network management system, and the RAN side device is further configured to send the collected drive test result information to the network management system to process.

It can be seen that the above technical scheme provided by the present invention comprises: the network side sending the measurement configuration and reporting information of the drive test to the user equipment; the user equipment performing the drive test, and reporting the drive test results containing the information of neighbor cells around the user equipment to the network side when the reporting triggering condition is satisfied. In the present invention, by using a MDT measurement event in the drive test, the information of neighbor cells around the user equipment is discovered and reported to the network side for maintenance, and since the network side obtains the information of neighbor cells around the user equipment in time, the effectiveness of the user equipment performing cell handover is guaranteed, thereby enhancing the network performance of a communication system.

PREFERRED EMBODIMENTS OF THE PRESENT INVENTION

Figure 1:
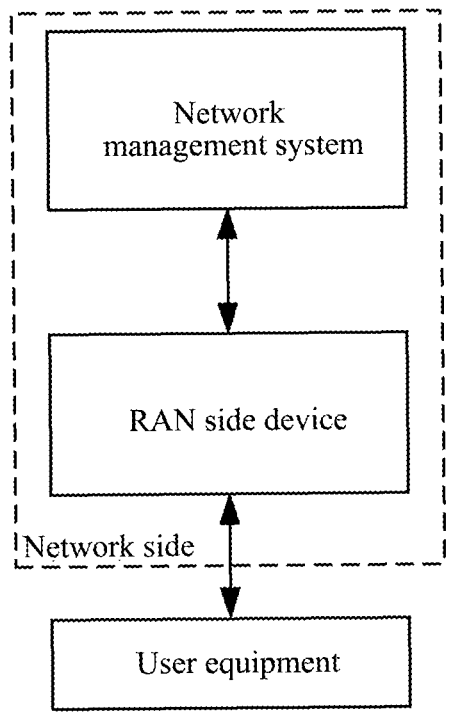
FIG. 1 is a schematic diagram of an application framework of the existing MDT in the UMTS.
Figure 2:
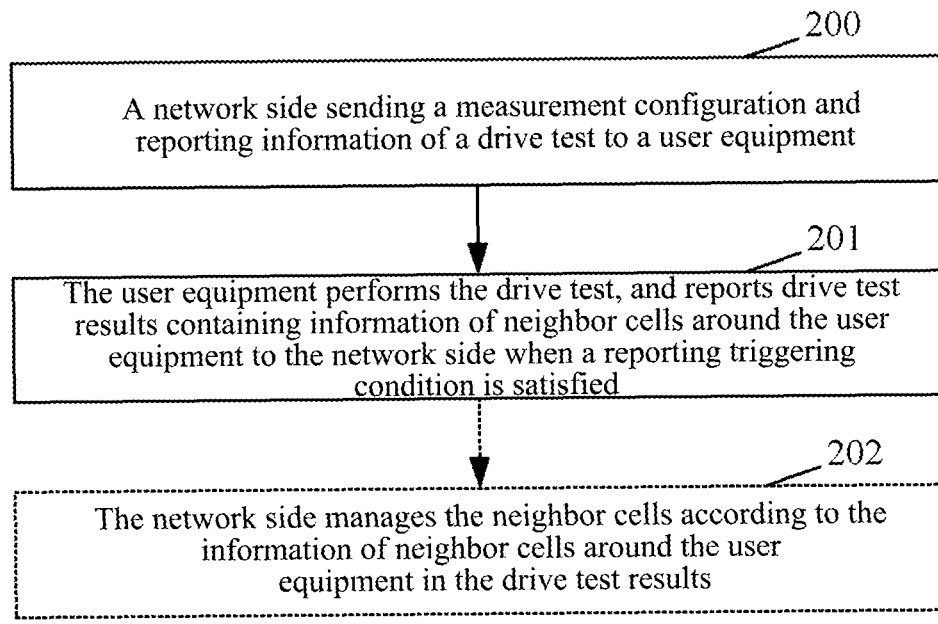
FIG. 2 is a flow chart of the method for implementing neighbor cell reporting according to the present invention.

FIG. 2 is a flow diagram of the method for implementing neighbor cell reporting according to the present invention, and as shown in FIG. 2, following steps are included.

In step 200, a network side sending a measurement configuration and reporting information of a drive test to a user equipment.

In the step, a RAN side sends the measurement configuration and reporting information of the drive test to the UE through a Control Plane (CP) according to requirements of a network management system.

The measurement configuration in the measurement configuration and reporting information contains configuration information of the MDT measurement contents, which is a newly added MDT measurement event: signals of surrounding cells are higher than a threshold. That is to say, when the UE measures that the signals of the surrounding cells are higher than the configured threshold, radio environment measurement is recorded, such as CPICH RSCP, CPICH Ec/No, or TDD P-CCPCH RSCP and ISCP, RSRP and RSRQ (only in connection mode).

The newly added MDT measurement event can be reported in real time, and also can be reported in a log mode after recording for a period of time, and the UE can perform measurement recording in either an IDLE state or a connection state. If the UE perform the measurement recording in the connection state or IDLE state, a measurement log window is required, and the object is to collect information in a certain period of time before and after the event occurs.

Specific contents measured and reported by the newly added MDT measurement event are included as follows.

a) A measurement triggering type: the measurement is triggered when the signals of the surrounding cells measured by the user equipment are higher than the threshold.

b) A configuration parameter: the threshold. It can be a background configuration value.

c) If there is the measurement log window, it is used to indicate a log recording window; and if there is a measurement log interval, it is used to indicate a measurement recording interval under the log recording window.

d) Measurement contents: any combination of one or several kinds of following contents can be included:

location information: location information when measurement event triggering occurs and location information when measurement recording occurs;

a timestamp: a time at which measurement event triggering occurs and a time at which measurement recording occurs;

Cell identity information: cell identification information of the surrounding cells measured when measurement event triggering occurs, for example, the cell identity information can be Physical Cell Identifier (PCI) information or Cell Global Identifier (CGI) information of the cells in the LTE system, and can be Primary Scrambling Code (PSC) information or Cell Identifier (CI) information and so on of the cells in the UMTS;

Radio environment measurement information: signal quality information of the surrounding cells measured when measurement event triggering occurs, and/or the signal quality information of the surrounding cells in a preset period of time, namely the measurement log window, before and after measurement event triggering occurs.

In step 201, the user equipment performs the drive test, and reports drive test results containing information of neighbor cells around the user equipment to the network side when a reporting triggering condition is satisfied.

The UE reports the drive test results to the RAN through a control plane signaling.

In step 202 of the method of the present invention, the network side manages the neighbor cells according to the information of neighbor cells around the user equipment in the drive test results. The network side can send the collected drive test result information to the network management system to process, or a base station processes the collected drive test results in local. How to process specifically does not belong to the protection scope of the present invention, which will not be described in detail here. What is emphasized in the present invention is to use the newly added MDT measurement event in the drive test to discover the information of neighbor cells around the user equipment and report to the network side for maintenance, and since the network side obtains the information of neighbor cells around the user equipment in time, effectiveness of the user equipment performing cell handover is guaranteed, thereby enhancing the network performance of a communication system.

Figure 3:
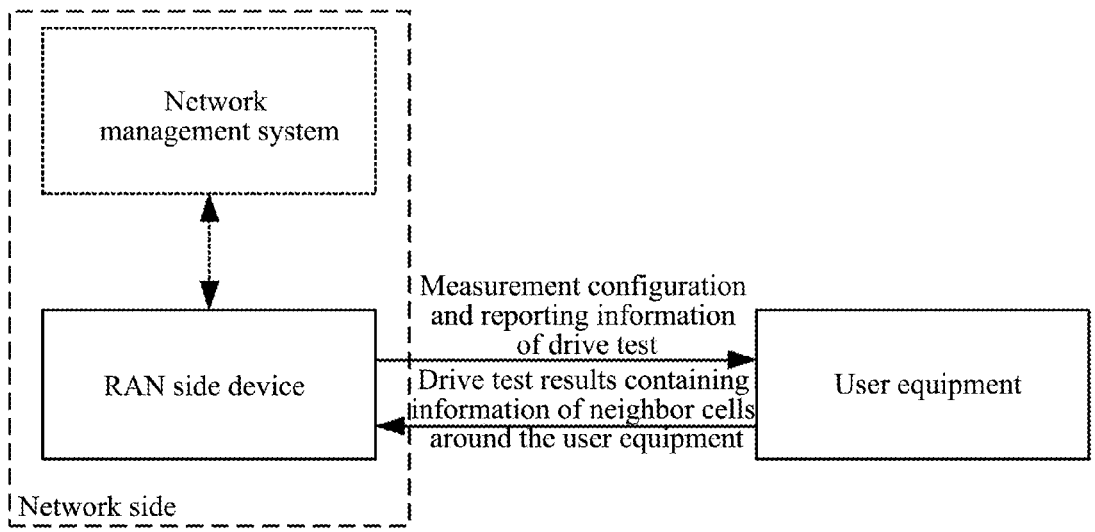
FIG. 3 is a schematic diagram of compositional structure of the system for implementing neighbor cell reporting according to the present invention.

With respect to the method of the present invention, FIG. 3 is a schematic diagram of compositional structure of the system for implementing neighbor cell reporting according to the present invention, and as shown in FIG. 3, at least the user equipment and a network side are comprised, wherein, the network side is configured to: send a measurement configuration and reporting information of a drive test to the user equipment.

the user equipment is configured to: perform the drive test, and report drive test results containing information of neighbor cells around the user equipment to the network side when a reporting condition is satisfied.

The network side is further configured to: manage the neighbor cells according to the information of neighbor cells around the user equipment in the drive test results.

The network side comprises a RAN side device, in a UMTS, the network side is a Radio Network Controller (RNC); and in a LTE system, the network side is an eNB.

Figure 4:
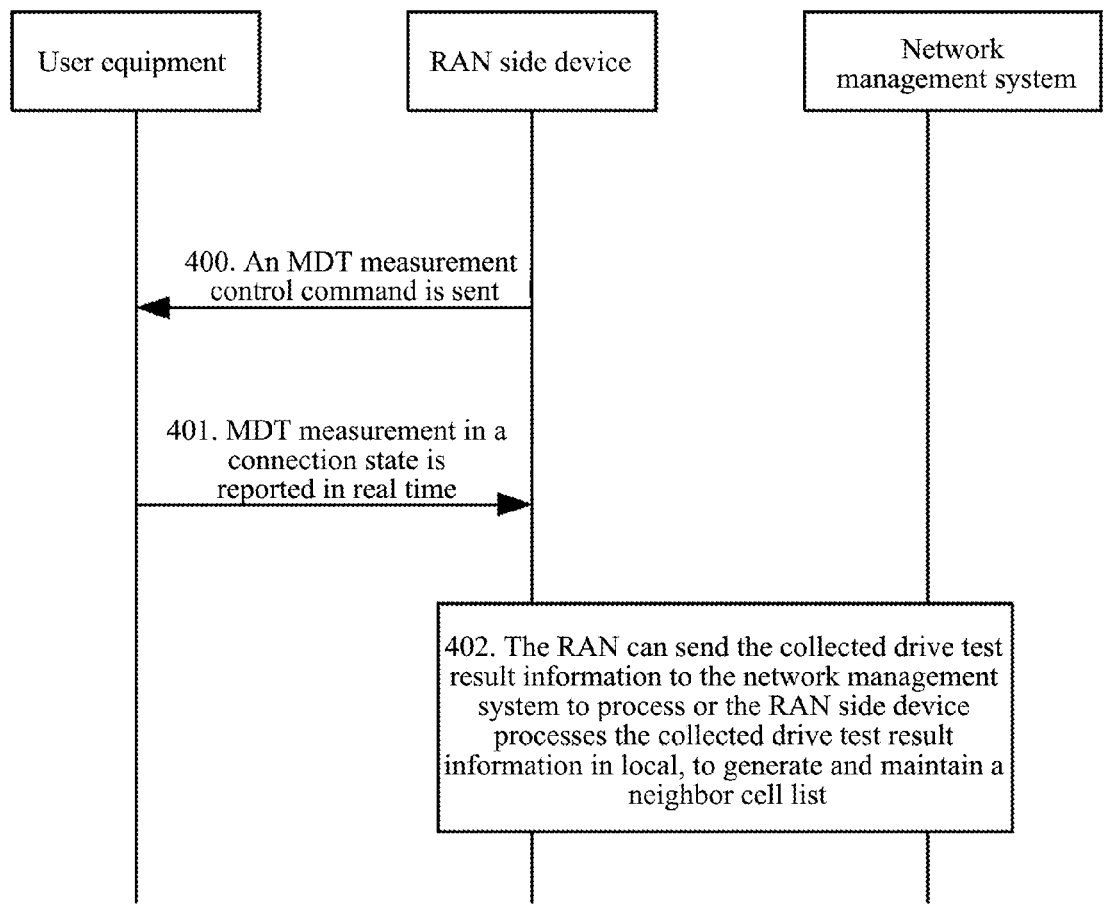
FIG. 4 is a flow chart of the example of reporting drive test results in real time with the user equipment being in a connection state according to the present invention.

FIG. 4 is a flow chart of the example of reporting drive test results in real time with the user equipment being in a connection state according to the present invention. The UE is in the connection state in a serving cell A in the example, and as shown in FIG. 4, following steps are included.

In step 400, a RAN side sends a measurement configuration and reporting information, namely a MDT measurement control command of a drive test, to the UE through a CP according to requirements of a network management system. Wherein, the measurement configuration of the drive test includes configuration information that a MDT measurement event is that the signals of surrounding cells are higher than a threshold, and in the example, the measurement configuration includes threshold information configured at the background.

In step 401, since the UE is in the connection state currently, and after receiving the MDT measurement control command, the UE measures the signals of the surrounding cells, such as measuring one or multiple kinds of intra-frequency cells, inter-frequency cells and inter-system cells (according to the ability of the UE); when the signals of one or multiple cells are higher than the threshold in the MDT measurement control command, such as recording that the signals of intra-frequency cell B, and/or inter-frequency cell C, and/or inter-system cell D are higher than the threshold, the UE performs real-time MDT measurement reporting.

In the example, specific contents of the MDT measurement reporting are as follows:

a measurement triggering type: the measurement is triggered when the signals of the surrounding cells measured by the UE are higher than the threshold;

a configuration parameter: the threshold, namely a configuration value acquired by a network management background;

measurement contents: one or multiple kinds of following contents can be included:

location information: location information when measurement event triggering occurs and location information when measurement recording occurs;

a timestamp: a time at which measurement event triggering occurs and a time at which measurement recording occurs;

cell identity information: identification information of the cell B and/or cell C and/or cell D measured when measurement event triggering occurs, for example, in the LTE system, the cell identity information can be PCT information of the cells, and the terminal also can read cell broadcast System Information Block (SIB) information to acquire CGI information of the cells; and in the UMTS, the cell identity information can be PSC information of the cells, and the terminal also can read the cell broadcast SIB information to acquire CI information, and/or Tracking Area Code (TAC) information, and/or Routing Area. Code (RAC) information, and/or Public Land Mobile Network (PLMN) information of the cells; and radio environment measurement information: signal quality information of the cell B and/or cell C and/or cell D measured when measurement event triggering occurs, and/or the signal quality information of the cell B and/or cell C and/or cell D within a period of time before and after measurement event triggering occurs. The signal quality information can be expressed as RSRP and RSRQ.

In step 402, the UE reports the drive test results to the RAN side device through a control plane signaling, and then the RAN side device can send the collected drive test result information to the network management system to process, or the RAN side device such as a base station/RNC processes the collected drive test result information in local.

In the step, in a UMTS environment, the RNC can perform local analysis and processing on the measurement results reported by the UE, it is assumed that the cell B is not a neighbor cell of the cell A currently, and if a plurality of UEs perform measurement reporting about the cell B and make a judgment in combination with the location information in the measurement report reported by the UE, the RNC can add the cell B as the neighbor cell of the cell A. In a LTE environment, an eNB can perform local analysis and processing on the measurement results reported by the UE, it is assumed that the cell B is not a neighbor cell of the cell A currently, and if a plurality of UEs perform measurement reporting about the cell B and make a judgment in combination with the location information in the measurement report reported by the UE, the eNB can add the cell B as the neighbor cell of the cell A.

The processing of the above drive test report also can be processed in a network element of the network management system.

Figure 5:
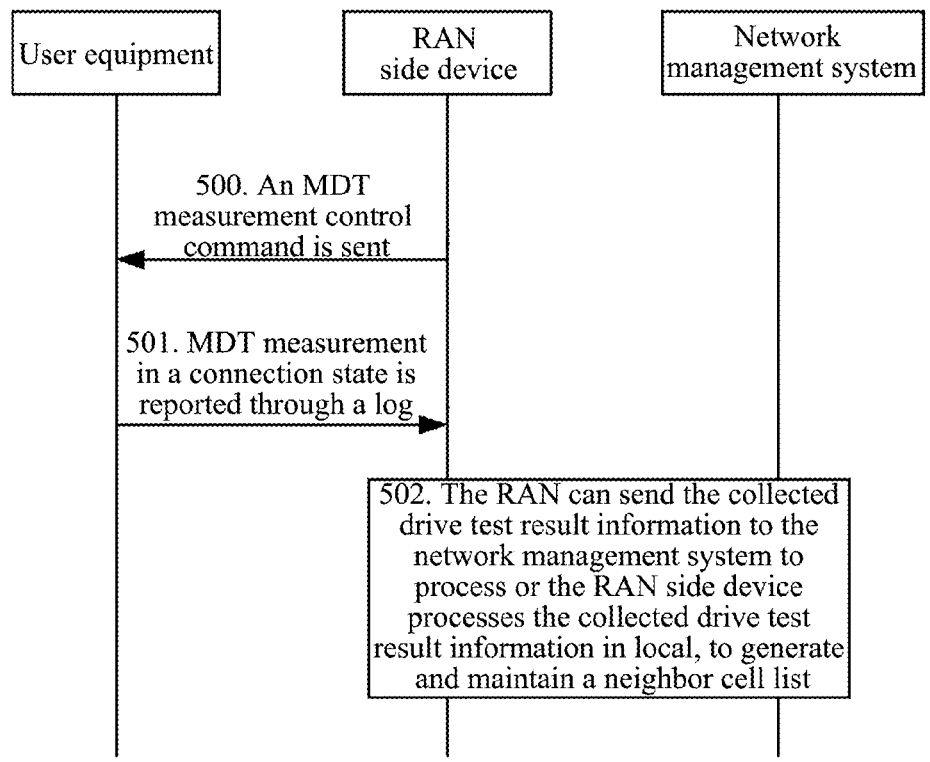
FIG. 5 is a flow chart of the example of reporting drive test results in a log mode with the user equipment being in a connection state according to the present invention.

FIG. 5 is a flow chart of the example of reporting drive test results in a log mode with the user equipment being in a connection state according to the present invention. The UE is in the connection state in a serving cell A in the example, and as shown in FIG. 5, following steps are included.

In step 500, a RAN side sends a measurement configuration and reporting information, namely a MDT measurement control command of a drive test, to the UE through a CP according to requirements of a network management system. Wherein, the measurement configuration of the drive test includes configuration information that a MDT measurement event is that signals of surrounding cells are higher than a threshold, and in the example, the measurement configuration includes threshold information configured at the background.

In step 501, since the UE is in the connection state currently, and after receiving the MDT measurement control command, the UE measures the signals of the surrounding cells, such as measuring one or multiple kinds of intra-frequency cells, inter-frequency cells and inter-system cells (according to the ability of the UE); when the signals of one or multiple cells are higher than the threshold in the MDT measurement control command, such as recording that the signals of intra-frequency cell B, and/or inter-frequency cell C, and/or inter-system cell D are higher than the threshold, the UE performs reporting after making MDT measurement record for a period of time.

In the example, specific contents of the MDT measurement reporting are as follows:

a measurement triggering type: the measurement is triggered when the signals of the surrounding cells measured by the UE are higher than the threshold;

a configuration parameter: the threshold, namely a configuration value acquired by a network management background;

a measurement log window, used to indicate a log recording window, e.g. 1 hour is one recording window;

a measurement log interval, used to indicate a measurement recording interval, e.g. 10 minutes, under the log recording window;

measurement contents: one or multiple kinds of following contents can be included:

location information: location information when measurement event triggering occurs and location information when measurement recording occurs;

a timestamp: a time when measurement event triggering occurs and a time when measurement recording occurs;

cell identity information: identification information of the cell B and/or cell C and/or cell D measured in the occurrence of measurement event triggering, for example, in a LTE system, the cell identity information can be PCI information of the cells, and furthermore, the terminal also can read cell broadcast SIB information to acquire CGI information of the cells; and in a UMTS, the cell identity information can be PSC information of the cells, and furthermore, the terminal also can read the cell broadcast SIB information to acquire CI information, and/or TAC information, and/or RAC information, and/or PLMN information of the cells; and radio environment measurement information: signal quality information of the cell B and/or cell C and/or cell D measured when measurement event triggering occurs, and/or the signal quality information of the cell B and/or cell C and/or cell D within a period of time before and after measurement event triggering occurs. The signal quality information can be expressed as RSRP and RSRQ.

In step 502, the UE reports the drive test results to the RAN side device through a control plane signaling, and then the RAN side device can send the collected drive test result information to the network management system to process, or the RAN side device such as a base station/RNC processes on the collected drive test result information in local.

In the step, in a UMTS environment, the RNC can perform local analysis and processing on the measurement results reported by the UE, it is assumed that the cell B is not a neighbor cell of the cell A currently, and if a plurality of UEs perform measurement reporting about the cell B and make a judgment in combination with the location information in the measurement report reported by the UE, the RNC can add the cell B as the neighbor cell of the cell A. In a LTE environment, an eNB can perform local analysis and processing on the measurement results reported by the UE, it is assumed that the cell B is not a neighbor cell of the cell A currently, and if a plurality of UEs perform measurement reporting about the cell B and make a judgment in combination with the location information in the measurement report reported by the UE, the eNB can add the cell B as the neighbor cell of the cell A.

The process of the above drive test reporting also can be performed in a network element of the network management system.

Figure 6:
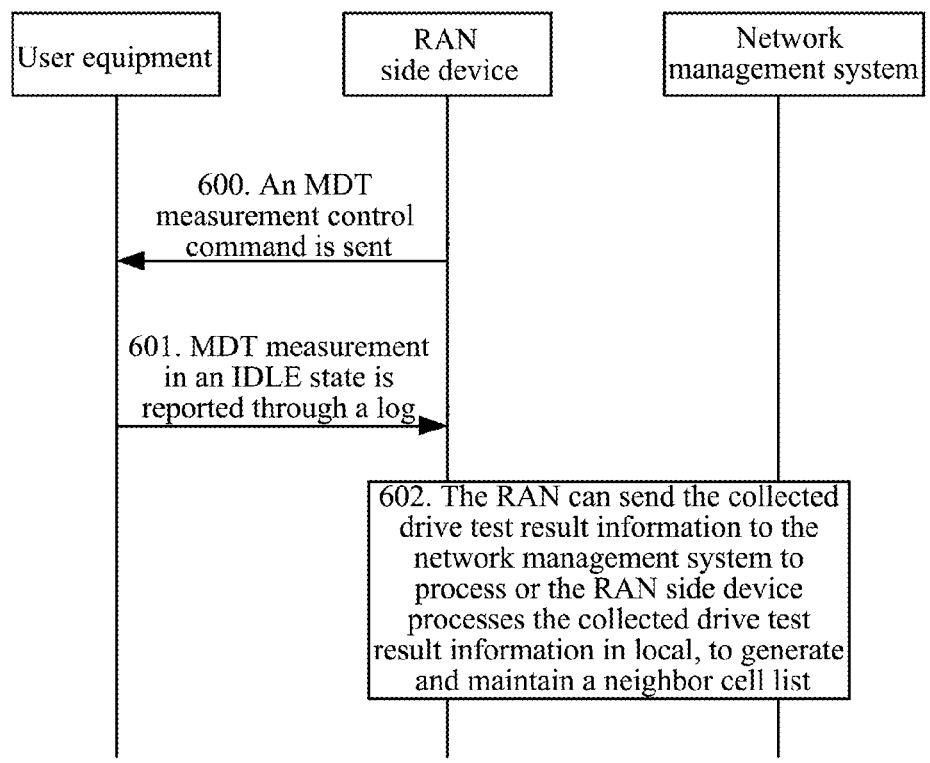
FIG. 6 is a flow chart of the example of reporting drive test results in a log mode with the user equipment being in an idle state according to the present invention.

FIG. 6 is a flow chart of the example of reporting drive test results in a log mode with the user equipment being in an idle state according to the present invention. The UE is in the IDLE state in a serving cell A in the example, and as shown in FIG. 6, following steps are included.

In step 600, a RAN side sends a measurement configuration and reporting information, namely a MDT measurement control command of a drive test, to the UE through a CP according to requirements of a network management system. Wherein, the measurement configuration of the drive test includes configuration information that a MDT measurement event is that signals of surrounding cells are higher than a threshold, and in the example, the measurement configuration includes threshold information configured at the background.

In step 601, after receiving the MDT measurement control command, the UE measures the signals of the surrounding cells, such as measuring one or multiple kinds of intra-frequency cells, inter-frequency cells and inter-system cells (according to the ability of the UE); when the signals of one or multiple cells are higher than the threshold in the MDT measurement control command, such as recording that the signals of intra-frequency cell B, and/or inter-frequency cell C, and/or inter-system cell D are higher than the threshold, the UE performs reporting after making MDT measurement record for a period of time.

In the example, specific contents of the MDT measurement reporting are as follows:

a measurement triggering type: the measurement is triggered when the signals of the surrounding cells measured by the UE are higher than the threshold;

a configuration parameter: the threshold, namely a configuration value acquired by a network management background;

a measurement log window, used to indicate a log recording window, e.g. 1 hour is one recording window;

a measurement log interval, used to indicate a measurement recording interval, e.g. 10 minutes, under the log recording window;

measurement contents: one or multiple kinds of following contents can be included:

location information: location information when measurement event triggering occurs and location information when measurement recording occurs;

a timestamp: a time when measurement event triggering occurs and a time when measurement recording occurs;

cell identity information: identification information of the cell B and/or cell C and/or cell D measured in the occurrence of measurement event triggering, for example, in a LTE system, the cell identity information can be PCI information of the cells, and furthermore, the terminal also can read cell broadcast SIB information to acquire CGI information of the cells; and in a UMTS, the cell identity information can be PSC information of the cells, and furthermore, the terminal also can read the cell broadcast SIB information to acquire CI information, and/or TAC information, and/or RAC information, and/or PLMN information of the cells; and radio environment measurement information: signal quality information of the cell B and/or cell C and/or cell D measured when measurement event triggering occurs, and/or the signal quality information of the cell B and/or cell C and/or cell D within a period of time before and after measurement event triggering occurs. The signal quality information can be expressed as RSRP and RSRQ.

In step 602, the UE reports the drive test results to the RAN side device through a control plane signaling, and then the RAN side device can send the collected drive test result information to the network management system to process, or the RAN side device such as a base station/RNC processes the collected drive test result information in local.

In the step, in the UMTS environment, the RNC can perform local analysis and processing on the measurement results reported by the UE, it is assumed that the cell B is not a neighbor cell of the cell A currently, and if a plurality of UEs perform measurement reporting about the cell B and make a judgment in combination with the location information in the measurement report reported by the UE, the RNC can add the cell B as the neighbor cell of the cell A. In the LTE environment, an eNB can perform local analysis and processing on the measurement results reported by the UE, it is assumed that the cell B is not a neighbor cell of the cell A currently, and if a plurality of UEs perform measurement reporting about the cell B and make a judgment in combination with the location information in the measurement report reported by the UE, the eNB can add the cell B as the neighbor cell of the cell A.

The process of the above drive test reporting also can be performed in a network element of the network management system.

The above description is only the preferred examples of the present invention, which is not used to limit the protection scope of the present invention. All the modifications, equivalent substitutions, and improvements, etc. made within the spirit and principle of the present invention should fall into the protection scope of the present invention.

What is claimed is:

1. A method for implementing neighbor cell reporting, comprising:
    a network side sending a measurement configuration and reporting information of a drive test to a user equipment; and
    the user equipment performing the drive test, and reporting drive test results containing information of neighbor cells around the user equipment to the network side when a reporting triggering condition is satisfied;
    wherein the measurement configuration contains a threshold, and the measurement configuration is used to trigger measurement when the signals of the surrounding cells measured by the user equipment are higher than the threshold.

2. The method according to claim 1, further comprising:
    the network side managing the neighbor cells according to the information of neighbor cells around the user equipment in the drive test results.

3. The method according to claim 2, wherein, managing the neighbor cells comprises:
    the network side processing collected drive test results locally; or,
    the network side sending the collected drive test results to a network management system to process.

4. The method according to claim 1, wherein, a measurement event uses a real-time reporting mode, and here,
    contents measured and reported by the measurement event comprise:
    a measurement triggering type: triggering the measurement when the signals of the surrounding cells measured by the user equipment are higher than the threshold;
    a configuration parameter: the threshold;
    measurement contents: containing any combination of one or several kinds of the following contents:
        location information: location information when measurement event triggering occurs and location information when measurement recording occurs;
        a timestamp: a time at which measurement event triggering occurs and a time at which measurement recording occurs;
        cell identity information: cell identification information of the surrounding cells measured when measurement event triggering occurs; and
        radio environment measurement information: signal quality information of the surrounding cells measured when measurement event triggering occurs.

5. The method according to claim 4, wherein, the measurement event uses a log reporting mode, and here,
    the contents measured and reported by the measurement event further comprise:
    a measurement log window, used to indicate a log recording window;
    a measurement log interval, used to indicate a measurement recording interval under the log recording window;
    the radio environment measurement information further comprises: signal quality information of the surrounding cells in the measurement log window before and after measurement event triggering occurs.

6. The method according to claim 5, wherein, in a Long Term Evolution (LTE) system, the cell identity information is Physical Cell Identifier (PCI) information and/or Cell Global Identifier (CGI) information;
    in a Universal Mobile Telecommunications System (UMTS), the cell identity information is Primary Scrambling Code (PSC) information, and/or Cell Identifier (CI) information, and/or Tracking Area Code (TAC) information, and/or Routing Area Code (RAC) information, and/or Public Land Mobile Network (PLMN) information of the cells.

7. A system for implementing neighbor cell reporting, at least comprising: a user equipment and a network side, wherein,
    the network side is configured to: send a measurement configuration and reporting information of a drive test to the user equipment; and
    the user equipment is configured to: perform the drive test, and report drive test results containing information of neighbor cells around the user equipment to the network side when a reporting condition is satisfied;
    wherein the measurement configuration contains a threshold, and the measurement configuration is used to trigger measurement when the signals of the surrounding cells measured by the user equipment are higher than the threshold.

8. The system according to claim 7, wherein, the network side is further configured to: manage the neighbor cells according to the information of neighbor cells around the user equipment in the drive test results.

9. The system according to claim 8, wherein, the network side comprises a Radio Access Network (RAN) side device;
    in a Universal Mobile Telecommunications System (UMTS), the RAN side device is a Radio Network Controller (RNC); and in a Long Term Evolution (LTE) system, the RAN side device is an evolved Node B (eNB).

10. The system according to claim 9, wherein, the network side further comprises a network management system, and the RAN side device is further configured to send the collected drive test result information to the network management system to process.

* * * * *